United States Patent [19]

Fritzsche

[11] 4,300,121

[45] Nov. 10, 1981

[54] WARNING SYSTEM FOR TRAFFIC ROUTES AT AN AVALANCHE DANGER HILLSIDE

[76] Inventor: Wilfried Fritzsche, No. 34, Eissendorfer Strasse, 2100 Hamburg 90, Fed. Rep. of Germany

[21] Appl. No.: 27,647

[22] Filed: Apr. 6, 1979

[30] Foreign Application Priority Data

Apr. 12, 1978 [DE] Fed. Rep. of Germany ....... 2815773

[51] Int. Cl.³ .......................... G08G 1/00; G08G 1/07; G11S 13/95; G01W 1/00
[52] U.S. Cl. .................................. 340/22; 73/170 R; 340/601; 343/7 ED
[58] Field of Search ................. 340/22, 601, 602, 604, 340/554, 41 R, 41 A; 343/5 PD, 5 W, 7 ED, 5 SA; 367/88, 96, 908; 73/170 R

[56] References Cited

U.S. PATENT DOCUMENTS

| | | | |
|---|---|---|---|
| 3,491,358 | 1/1970 | Hicks | 343/5 W |
| 3,775,766 | 11/1973 | Gendreu et al. | 343/5 W |

FOREIGN PATENT DOCUMENTS 2226670 11/1974 France .............................. 343/5 W

OTHER PUBLICATIONS

"Electromagnetic Sounding . . . Glaciers", *Soviet Physics*, vol. 16, No. 6, Dec. 1971, pp. 1022–1030.

Primary Examiner—James J. Groody
Attorney, Agent, or Firm—John C. Smith, Jr.

[57] ABSTRACT

A warning system for traffic routes at an avalanche danger hillside is provided wherein the hillside ground is divided in an assumed avalanche falling direction, thus into a series of areas which are e.g. about 30 meters wide. These areas each have at least one associated indication device with an electronic signal output, and the signals of the indication device are fed to a memory which, for a downhill correct sequence of the signals, energizes an avalanche alarm and releases the alarm when, by virtue of the stored experience data, there is no longer a risk below the avalanche area. The indication devices receive an electronic signal output of a receiver for the reflected waves of at least one radar transmitter, and these signals from the indication device are fed to an electronic logic circuit which, for a downhill correct sequence of the signals energizes and releases an avalanche alarm in accordance with the snow movement on the hillside.

6 Claims, 8 Drawing Figures

WARNING SYSTEM FOR TRAFFIC ROUTES AT AN AVALANCHE DANGER HILLSIDE

BACKGROUND OF THE INVENTION

This invention relates to a warning system for traffic routes at an avalanche danger hillside. To detect avalanche falls at their beginning already, i.e. in the zone of initiation, is of great importance for warning, protection and rescuing measures to possibly be initiated. The most important measure is a timely blocking, depending on the falling period of the avalanche in relationship to the traveling speed on the traffic route and a possible releasing of traffic again. For this purpose, predominantly mechanical systems are known which indicate avalanche falls at individual points or along a cross course of a hillside, namely e.g. wires strung across wooden pegs which are torn by a falling avalanche, or yieldable rods movable about an axis with electrical contacts. The former system has the disadvantage that after each incidence new wires must be strung, whereas the latter system is endangered by creeping snow and calls for specific measures in order to avoid a freezing. Large hill or mountain areas cannot be economically supervised with the conventional mechanical systems.

Efforts have generally been made by the inventor to use CW Doppler radar for avalanche supervision, as known for burglary alarm systems. These systems, however, already respond to small motions in the proximity of the antenna, e.g. by a bird; they also are hardly able to distinguish a snow slide from a transverse or uphill movement of an animal. The many erroneous alarms to be expected reduce the observation of an alarm signal in the event of an avalanche risk up to unusability of the entire system. Also, with one Doppler radar device alone a large hill or mountain area can hardly be effectively supervised, since the problems with two differently intense signals become more difficult for CW radar with increasing magnitude.

SUMMARY OF THE INVENTION

It is, therefore, an object of the present invention to provide a reliable and economically reasonable avalanche warning system.

To attain this object the present invention provides a warning system for traffic routes at an avalanche danger hillside, wherein (a) the hillside ground is divided in an assumed avalanche falling direction, thus at least approximately in gradient direction, into a series of areas which are e.g. about 30 meters wide, (b) these areas each have at least one own indication device with an electronic signal output, and (c) these signals of the indication device are fed to the electronic interlacing circuit which for a downhill correct sequence of the signals releases or extinguishes again an avalanche alarm when by virtue of stored experience data there is or is no longer a risk on a traffic route underneath the hillside.

The nature of the invention resides in the division of the hillside or mountainside from uphill to downhill in direction of movement of the avalanche into a plurality of supervision areas. In each of these areas, variations are recorded. A falling avalanche is now defined by a sequence of signals in different areas. For from uphill to downhill the signals must follow the direction of movement. A different order would permit the conclusion of interferences. The detection how far the movement goes downhill is also of particular importance. For the blocking period is to be made dependent on this. Fortunately, even at normally dangerous avalanche hillsides often only small snow sliding is to be observed. In this event, a blocking by the traffic system may be released again at an early period of time. When the avalanche falls to the traffic route, the supervision, e.g. the road authorities, are to be notified. As traffic routes in this sense prevailingly roads are envisaged. But also skiing routes or railroad tracks may be involved. In the latter case, the length of the railroad trains must be particularly monitored. It is pointed out here already that because of the possible minimum speed regulations for speedways (protection distance s) in FIG. 2 the movement distance of the avalanche must be 4 s. For roads on which cyclists, walkers etc. must be expected also, the movement distance is to be doubled (8 s). These rule values must of course be checked in the individual case by avalanche experts. There are many examples in the Alpes, however, where such systems could be employed.

By the electronic radar warning system according to the invention, it may at any time be checked whether in the individual hill areas there is a downhill snow movement, whether there is a downhill sequence of snow movements correct for an avalanche and what extent and what speed the snow movements have. According to these indications, it can concludingly be decided whether protection and rescuing measures must be taken and if so which ones and at what time they may possibly be dispensed with again.

The warning system according to the invention uses one or more detouring avalanche courses two or more impulse radars with the well-known motion indications, e.g. flight supervision radar (moving target indicator).

When the impulse radar has a continuous oscillator and only the energy is amplified impulsewise, even for impulse operation by remixing the Doppler frequency may be determined, and this method known per se is able to combine the advantages of impulse radar and Doppler radar.

A normal CW Doppler radar has, as alluded to hereinbefore, only a small uninterfered action range. However, for any indication range, an own Doppler radar may be used which are arranged e.g. at the side of the avalanche course consecutively.

When using a plurality of CW Doppler radars of low capacity, the direction of movement in each area may be detected by CW Doppler radar receivers arranged at a distance $\lambda/4$ in radiating direction. The phase of the LF obtained by mixing the transmitter and receiver frequencies is for the receiver devices shifted by $\lambda/4$ (of the HF) dependent on the direction of movement of the reflecting parts (snow). The directional detection may be effected in a manner known per se by converting the sine LF voltage into square-wave voltages by logic circuits. (Comparison of the differentiated LF voltage of the one receiver with the LF voltage of the other receiver).

In the lower area of the hillside, radar systems are not convenient in the event there is public or automotive vehicle traffic in the vicinity. This would result in erroneous indications, since vehicle movements may also be indicated. Here, devices having a reach of only 1 to 2 meters are suitable, which have an elongate charateristic, however, i.e. e.g. with long wires as electrodes, in particular if they are extensive as Lecher lines in pairs flatly along the hillside and are fed with relatively high frequencies. These respond to the variation of the dielectric properties of the environment, then of course only quick movements being considered so that there is no releasing with slowly increasing snow depth of a normal snow fall.

BRIEF DESCRIPTION OF THE DRAWINGS

Several embodiments of the invention will now be described by way of example and with reference to the accompanying drawings in which.

DESCRIPTION OF THE PREFERRED EMBODIMENTS

Figure 1:
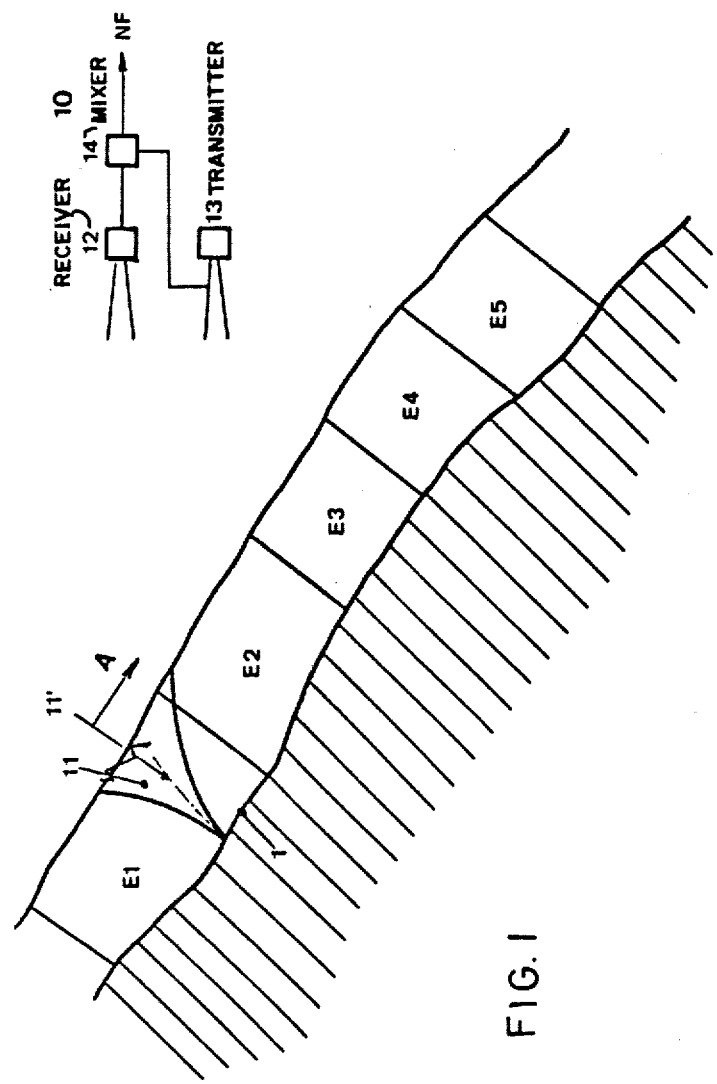
FIG. 1 is a cross section of an avalanche hillside with an avalanche beginning.

FIG. 1 shows a hillside 1. Opposite to it, there is a radar installation, comprising receiver 12, transmitter 13 and mixer 14. A gap 11 has formed in the snow, and the snow at the right-hand side thereof begins to slip downhill. At least the right-hand corner of the gap furnishes a radar signal. For evaluation, the hillside is divided into distance areas such as E1, E2 etc. This division is of course only ideally at the hillside. It is bodily present in the evaluation circuitry of the radar. Possibly areas in the vicinity of traffic routes have associated different indications (see FIG. 2).

Figure 2:
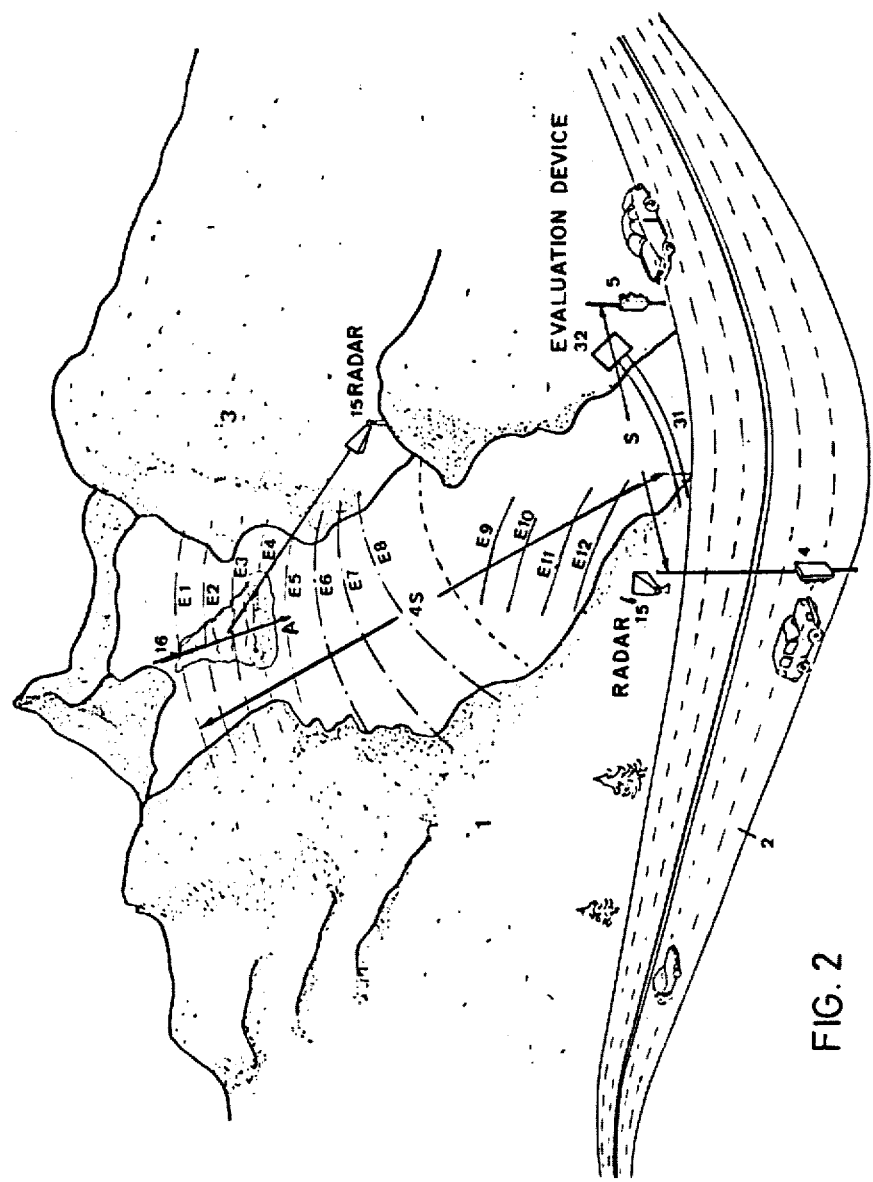
FIG. 2 is a survey of most of the possibilities of the invention for the protection of a traffic route.

FIG. 2 illustrates a hillside 1 provided with radar 15 which supervises the upper portion and radar 15' which supervises from a slightly different direction the lower areas E8–E12. Directly adjacent to the speedway 2, Lecher lines 31 are arranged having an evaluation device 40 (lowermost indication area). Traffic lights 4 and 5 possibly block the road. The distance between them is designated s as protection zone. The avalanche must approximately start at a distance 4 s, if a timely warning is to be effected. Assumption: Vehicle v > 10 m/s, avalanche having at a maximum a mean speed of 40 m/s. This coarse assumption is to not put off a precise recalculation of the traveling diagrams, but it is to demonstrate that there are frequent uses in the Alpes.

Figure 2A:
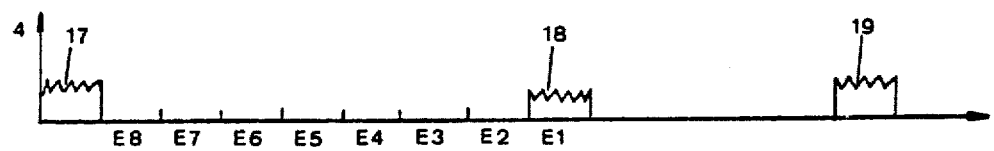
FIGS. 2a and 2b are signals of an impulse radar during a beginning avalanche.
Figure 2B:
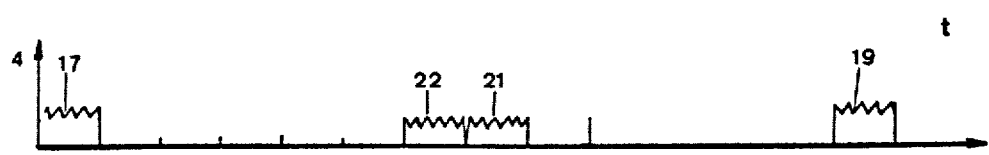

A snow tear-off 16 has started in the distance area E1. At the time which is illustrated in the drawing, it is moving over the distance areas E2, E3 and may already be recognized in the area E4. FIG. 2a shows a picture as may for instance be seen in the oscillograph of the radar receiver (A scan) when the stationary targets have been suppressed in a manner known per se. In FIG. 2a, the signal 18 is found in the area E1. FIG. 2b shows the instant a little time later; the movement has passed over to the distance area E2 with the signal 21 and E3 with the signal 22. The logic circuit may thus detect the avalanche from conditions defined in this way.

Figure 3:
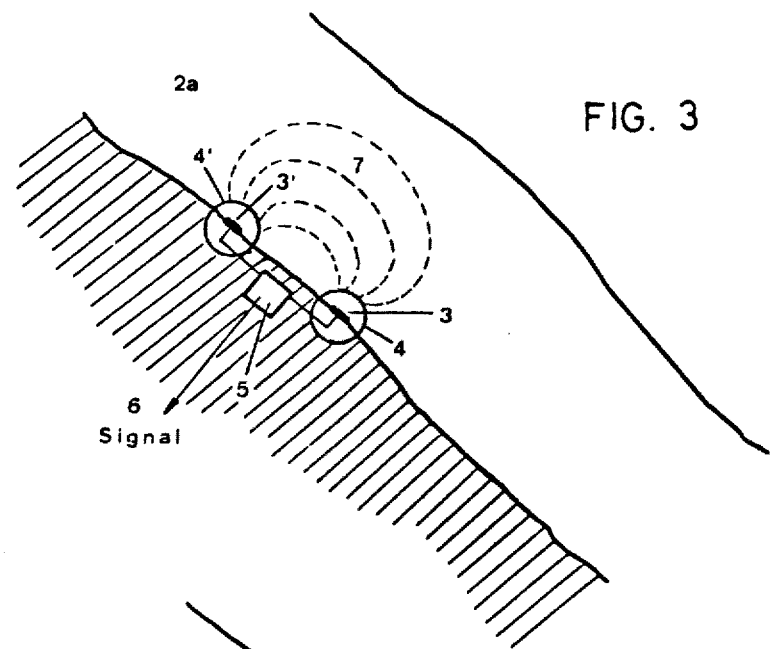
FIG. 3 is an electrode arrangement to be preferably arranged in the vicinity of traffic routes.

According to FIG. 3 at the surface 1 of a hillside covered with a snow layer 2a there are arranged two electrodes 3 and 3' encapsulated in insulating bodies 4 and 4' transverse of the hillside. Additionally, the electric field lines 7 passing through the snow layer 2a have been plotted, the not illustrated field lines in the hill are to be considered to be constant in relationship to short-time variations. In the event the snow layer 2a falls as an avalanche, the dielectric properties of the snow will vary in the course of the movement. These quick variations are detected by a measuring device 5 and then are transmitted as signal via wire or wireless. Slow variations, e.g. as a result of metamorphosis of the snow or gradual melting are not indicated as a result of the lower frequency limit of the measuring device 5.

Figure 4:
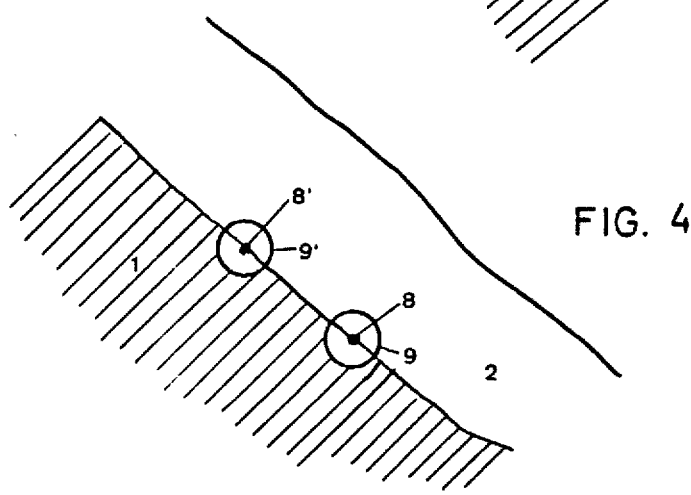
FIGS. 4 and 4a show a warning system having Lecher lines and serving the same purpose.
Figure 4A:
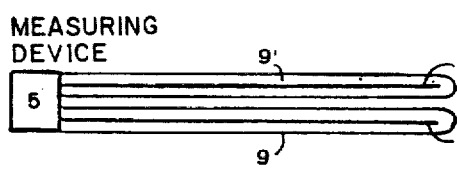

According to FIG. 4, in a similar manner Lecher lines 8 and 8' are used in elongate insulating bodies 9 and 9'; FIG. 4a shows a side-elevational view.

Figure 5:
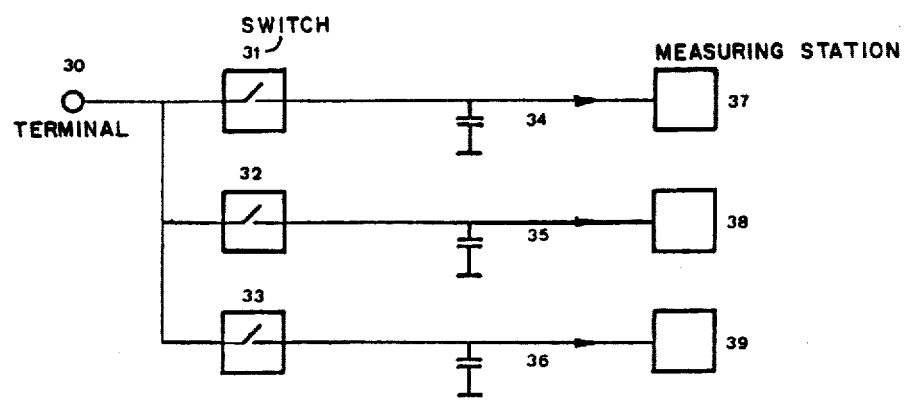
FIG. 5 shows a receiver apparatus.

The demodulated receiver signal of the impulse radar is fed into a terminal 30 (FIG. 5). For the period of time during which the signals (cf. FIGS. 2a and 2b) are received at the receiver station from the distance areas E1 or E2 or E3, switches 31 or 32 or 33 are closed e.g. for 100 ns.

In FIGS. 2a and 2b, this time course of the time axis t has been designated E1, E2 and E3. The beginning thereof corresponds to the duration of the electromagnetic waves from the transmitter to the reflexion area and back again, measured from the instant of transmitting impulse. The opening duration is about 100 ns for a usual strip width.

At the next transmitting impulse 19, it is compared in a measuring station 37 whether the voltage at the capacitor 34 varies. In this case, a signal for the logic interlacing circuit is transmitted. The same occurs with the measuring stations 38 and 39. The measuring stations 37, 38 and 39 of the receiving apparatus thus correspond to the indicating devices of those areas into which the avalanche hillside is divided; their outputs are then passed on to the logic interlacing circuit, e.g. microprocessor, for a decision on blocking or releasing.

Reflection devices (snow levels) and radar reflectors according to the German Offenlegungsschrift No. 2,252,071 may be employed.

The following is a summary of the basic aspects of the invention. A warning system for traffic routes at an avalanche danger hillside is provided wherein the hillside ground is divided in an assumed avalanche falling direction into a series of areas which are e.g. about 30 meters wide. These areas have at least one indication device with an electronic signal output, and the signals of the indication device are fed to a memory means which, for a downhill correct sequence of the signals, energizes an avalanche alarm and releases the alarm when, by virtue of the stored experience data, there is no longer a risk below the avalanche area.

The indication devices receive an electronic signal output of a receiver for the reflected waves of at least one radar transmitter, and these signals from the indication device are fed to an electronic logic circuit which, for a downhill correct sequence of the signals, energizes and releases an avalanche alarm in accordance with the snow movement on the hillside.

The invention may be embodied in other specific forms without departing from the spirit or the essential characteristics thereof. The embodiments are therefore to be considered in all respects as illustrative and not restrictive.

What is claimed is:

1. A warning system for detecting and indicating a snow avalanche occurring on a hillside comprising
    at least one radar transmitter directed so as to illuminate an area of said hillside under surveillance;

at least one radar receiver directed toward said area of said hillside for receiving reflected wave signals of said radar transmitter;

storage means connected to the output of said radar receiver for storing said received signals so as to determine stable conditions on said hillside;

comparing means coupled to the output of said radar receiver and said storage means for detecting a difference between subsequently received signals and the signals in said storage means; and indicator means coupled to the output of said comparing means.

2. The warning system of claim 1 wherein said radar comprises a pulsed radar.

3. The warning system of claim 1 wherein said radar comprises impulse Doppler radar.

4. The warning system of claim 1 wherein a plurality of non-pulsed Doppler radars are mounted on said hillside.

5. The warning system of claim 4 wherein said plurality of Doppler radars comprises pairs of directionally sensitive Doppler radars spaced at $\lambda/4$ in the radiating direction.

6. The warning system of claim 1 further comprising radar reflecting means installed in said hillside.

* * * * *